US006623883B1

United States Patent
Kise et al.

(10) Patent No.: US 6,623,883 B1
(45) Date of Patent: *Sep. 23, 2003

(54) ELECTRODE HAVING PTC FUNCTION AND BATTERY COMPRISING THE ELECTRODE

(75) Inventors: Makiko Kise, Tokyo (JP); Syoji Yoshioka, Tokyo (JP); Jun Aragane, Tokyo (JP); Hiroaki Urushibata, Tokyo (JP); Hisashi Shiota, Tokyo (JP); Takashi Nishimura, Tokyo (JP); Shigeru Aihara, Tokyo (JP); Daigo Takemura, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 26 days.

(21) Appl. No.: 09/485,692

(22) PCT Filed: Jun. 25, 1998

(86) PCT No.: PCT/JP98/02853

§ 371 (c)(1),
(2), (4) Date: Feb. 25, 2000

(87) PCT Pub. No.: WO99/67835

PCT Pub. Date: Dec. 29, 1999

(51) Int. Cl.⁷ .......................... H01M 10/50; H01M 2/34
(52) U.S. Cl. ...................... 429/59; 429/62; 429/232
(58) Field of Search ..................... 429/49, 62, 232, 429/59

(56) References Cited

U.S. PATENT DOCUMENTS 5,174,924 A * 12/1992 Yamada et al.
5,259,991 A * 11/1993 Kobayashi et al.

FOREIGN PATENT DOCUMENTS

| JP | 61-74257 | | 4/1986 |
|----|----------|---|--------|
| JP | 1-197963 | | 8/1989 |
| JP | 4-58455 | | 2/1992 |
| JP | 5-74493 | | 3/1993 |
| JP | 6-231749 | | 8/1994 |
| JP | 07-220755 A | * | 8/1995 |
| JP | 8-306354 | | 11/1996 |
| JP | 9-213305 | | 8/1997 |
| JP | 10-106516 | | 4/1998 |
| JP | 10-241665 | | 9/1998 |

* cited by examiner

Primary Examiner—Carol Chaney
Assistant Examiner—Susy Tsang-Foster
(74) Attorney, Agent, or Firm—Oblon, Spivak, McClelland, Maier & Neustadt, P.C.

(57) ABSTRACT

The object of the present invention is to obtain an electrode whose resistivity increases with temperature, and a battery using the same. Specifically, the invention consists in limiting the proportion of a conductive filler contained in electron conductive particles of an electron conductive particle layer to a range of from 55 to 70 parts by weight. A battery constituted by using the electrode has an increased discharge capacity and is capable of reducing a short-circuit current.

16 Claims, 6 Drawing Sheets

|  | VOLUME RESISTIVITY OF ELECTRODE (Ω·cm) | RATE OF CHANGE IN RESISTIVITY | SHORT-CIRCUIT CURRENT (A) |
| --- | --- | --- | --- |
| EXAMPLE 1 | 106 | 100 | 0.2 |
| COMPARATIVE EXAMPLE 1 | 60 | 0.9 | 13 |
| COMPARATIVE EXAMPLE 2 | 940 | 10 | 2.6 |

FIG. 3

|  | SHORT-CIRCUIT CURRENT (A) |
| --- | --- |
| EXAMPLE 1 | 0.2 |
| COMPARATIVE EXAMPLE 3 | 10.3 |

FIG. 4

|  | VOLUME RESISTIVITY OF ELECTRODE (Ω·cm) | RATE OF CHANGE IN RESISTIVITY | SHORT-CIRCUIT CURRENT (A) |
|---|---|---|---|
| EXAMPLE 2 | 114 | 105 | 0.3 |

FIG. 5

|  | VOLUME RESISTIVITY OF ELECTRODE (Ω·cm) | RATE OF CHANGE IN RESISTIVITY | SHORT-CIRCUIT CURRENT (A) |
|---|---|---|---|
| EXAMPLE 3 | 91 | 97 | 0.2 |

FIG. 6

|  | VOLUME RESISTIVITY OF ELECTRODE (Ω·cm) | RATE OF CHANGE IN RESISTIVITY | SHORT-CIRCUIT CURRENT (A) |
|---|---|---|---|
| EXAMPLE 4 | 61 | 103 | 0.2 |

ELECTRODE HAVING PTC FUNCTION AND BATTERY COMPRISING THE ELECTRODE

TECHNICAL FIELD

This invention relates to an electrode, a method of fabricating the electrode, and a battery using the electrode. More particularly, it relates to an electrode whose resistivity changes with a rise in temperature, a method of fabricating the electrode, and a battery using the electrode.

BACKGROUND OF THE INVENTION

In recent years, with the development of electronic equipment, batteries used therein as a power source have increasingly gained in capacity and output density. A lithium ion secondary battery is attracting attention as a battery fulfilling these requirements. A lithium ion secondary battery has an advantage of high energy density but requires sufficient measures for safety because of use of a nonaqueous electrolytic solution.

Conventionally proposed safety measures include a safety valve which relieves an increased inner pressure and a PTC element which increases resistivity on heat generation due to an external short-circuit to shut off the electric current. For example, incorporation of a safety valve and a PTC element into the cap of a positive electrode of a cylindrical battery is known as disclosed in JP-A-4-328278. However, on the safety valve's working, moisture in the air enters the inside of the battery, which can induce an exothermic reaction in case lithium exists in the negative electrode.

On the other hand, a PTC element, which cuts off the external circuit involving a short-circuit, exerts no bad influence on operating. The PTC element can be designed to operate when the battery temperature rises to, for example, 90° C. or higher due to an external short-circuit so as to be the first safety element to operate in case of abnormality.

Having the above-mentioned structure, conventional lithium secondary batteries involve the following problem. When a short-circuit occurs in the inside of the conventional lithium secondary battery to raise the temperature, the battery is incapable of suppressing an increase in short-circuit current.

In case where a short-circuit occurs in the inside of the lithium secondary battery to raise the temperature, a separator made of polyethylene or polypropylene interposed between a positive electrode and a negative electrode is expected to soften or melt to clog the pores of the separator, whereby the separator would exude the nonaqueous electrolytic solution contained therein or seal the nonaqueous electrolytic solution within itself to reduce its ion conductivity thereby to diminish the short-circuit current. However, the part of the separator distant from the heat generating part does not always melt. Besides, in case temperature rises, it is likely that the separator melts and flows to lose its function of electric insulation between positive and negative electrodes, which can lead to a short-circuit.

In particular, in the case of a lithium ion secondary battery, the negative electrode is prepared by coating a substrate functioning as a current collector, such as copper foil, with a slurry comprising a negative electrode active material such as graphite, a binder such as polyvinylidene fluoride (PVDF), and a solvent, and drying the coating layer to form a film. The positive electrode is similarly prepared in a film format on a substrate functioning as a current collector, such as aluminum foil.

The positive electrode comprises a positive electrode active material, such as $LiCoO_2$, a binder, and a conducting agent. The conducting agent is to enhance electron conductivity of the positive electrode in case where the active material has poor electron conductivity. The conducting agent to be used includes carbon black (e.g., acetylene black) and graphite (e.g., artificial graphite KS-6, produced by Lonza).

When the temperature of such a battery increases to or above the temperature at which the separator melts and flows due to, e.g., an internal short-circuit, a large short-circuit current flows between the positive and negative electrodes at the part where the separator flows. It follows that the battery temperature further increases by heat generation, which can result in a further increase of the short-circuit current.

The invention has been made in order to solve the above-described problem. An object of the invention is to provide an electrode which increases its resistivity with temperature, a method of fabricating the electrode, and a battery using the electrode.

DISCLOSURE OF THE INVENTION

A first electrode according to the invention is an electrode having an electron conductive material layer of an electron conductive material comprising a conductive filler and a resin and an active material layer formed on the electron conductive material layer, the electron conductive material increasing its resistivity with a rise in temperature, which is characterized in that the proportion of the conductive filler in the electron conductive material is from 55 to 70 parts by weight.

According to this aspect, since the proportion of the conductive filler in the electron conductive material is 55 to 70 parts by weight, the rate of change in resistivity of the electrode can be increased. A battery constituted by using the electrode has an increased discharge capacity and is capable of reducing a short-circuit current.

A second electrode according to the invention is characterized in that the resin has a melting point ranging from 90° C. to 160° C. Since a resin having a melting point ranging from 90° to 160° C. is used, the resistivity increases at a certain temperature or thereabouts within the range of from 90° to 160° C.

A third electrode according to the invention is characterized in that the electron conductive material has an average particle size of from 0.05 μm to 100 μm. The particle size of the electron conductive material ranging from 0.05 to 100 μm, the electrode increases its resistivity at around a prescribed temperature, and a battery using the electrode has an increased discharge capacity.

A fourth electrode according to the invention is characterized in that the conductive filler is a carbon material or a conductive non-oxide. Containing a carbon material or a conductive non-oxide as a conductive filler, the electrode has enhanced conductivity.

An fifth electrode according to the invention is characterized in that the resin is a crystalline resin. Containing a crystalline resin, the electrode has a further increased rate of change in resistivity at a prescribed temperature or thereabouts.

A first battery according to the invention is a battery having a positive electrode, a negative electrode, and an electrolytic solution provided between the positive and the negative electrodes, which is characterized in that the positive or negative electrode is any one of the above-described first to fifth electrodes. According to this aspect, since any of the first to fifth electrodes is used as the positive or negative electrode, the electrode increases the resistivity in case where the inner temperature of the battery rises to or above a prescribed temperature, thereby to reduce a short-circuit current. Therefore, the battery has improved safety.

A first method of fabricating an electrode according to the invention is characterized by comprising the steps of:
(a) pulverizing an electron conductive material containing a conductive filler and a resin,
(b) dispersing the resulting ground electron conductive material to make a paste,
(c) drying the paste to form an electron conductive material layer,
(d) dispersing an active material to prepare an active material paste, and
(e) applying the active material paste on the electron conducive material layer and pressing at a prescribed temperature under a prescribed pressure.

According to the process comprising the steps (a) to (d), the adhesion between the electron conductive material layer and the active material layer is improved thereby to reduce the contact resistance between the electron conductive material layer and the active material layer. As a result, the electrode prepared has a reduced resistivity.

A second method of fabricating an electrode according to the invention is characterized by comprising the steps of:
(a) pulverizing an electron conductive material containing a conductive filler and a resin,
(b) dispersing the resulting ground electron conductive material to make a paste,
(c) drying the paste and pressing the dried paste at a first temperature under a first pressure to form an electron conductive material layer,
(d) dispersing an active material to prepare an active material paste,
(e) drying the active material paste, and
(f) laying the dried active material paste on the electron conducive material layer and pressing at a second temperature under a second pressure to form an active material layer on the electron conductive material layer.

According to the process comprising the steps (a) to (f), the adhesion between the electron conductive material layer and the active material layer is improved thereby to reduce the contact resistance between the electron conductive material layer and the active material layer. As a result, the electrode prepared has a reduced resistivity.

A third method of fabricating an electrode according to the invention is characterized in that the prescribed temperature is the melting point of the resin or thereabouts. Since the prescribed temperature is the melting point of the resin or thereabouts, the adhesion between the electron conductive material layer and the active material layer is further improved thereby to further reduce the contact resistance between the electron conductive material layer and the active material layer. Further, the connection among the electron conductive material particles in the electron conductive material layer is improved thereby to reduce the resistance of the electron conductive material layer. Thus, the electrode prepared has a further reduced resistivity.

A fourth method of fabricating an electrode according to the invention is characterized in that the first temperature or the second temperature is the melting point of the resin or thereabouts. Since the first or second temperature is the melting point of the resin or thereabouts, the adhesion between the electron conductive material layer and the active material layer is further improved thereby to further reduce the contact resistance between the electron conductive material layer and the active material layer. Further, the connection among the electron conductive material particles in the electron conductive material layer is improved thereby to reduce the resistance of the electron conductive material layer. Thus, the electrode prepared has a further reduced resistivity.

BEST MODE FOR CARRYING OUT THE INVENTION

Figure 1:
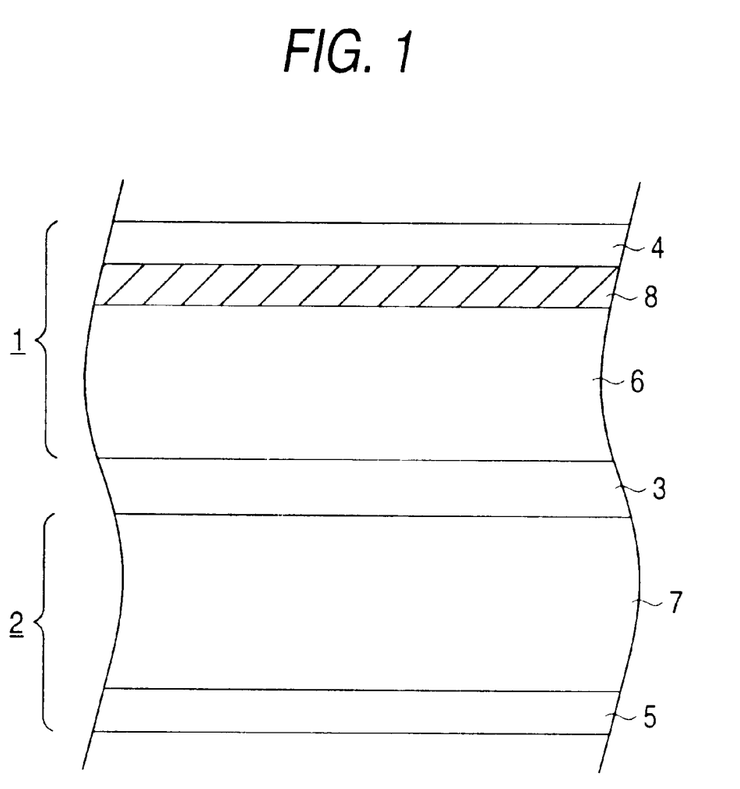
FIG. 1 is an illustration explaining the structure of the battery.

FIG. 1 is an illustration for explaining the structure of the battery according to the invention. More specifically, it is a cross-sectional view of the battery. In the Figure, numeral 1 indicates a positive electrode; 2 a negative electrode; and 3 a separator provided between the positive electrode 1 and the negative electrode 2.

The positive electrode 1 has a positive electrode current collector 4, a positive electrode active material layer 6, and a PTC layer corresponding to an electron conductive material layer. The negative electrode 2 has a negative electrode current collector 5 and an negative electrode active material layer 7.

The positive electrode 1 is composed of a metal film serving as the positive electrode current collector 4 (e.g., an aluminum film), the PTC (positive temperature coefficient) layer 8 formed on the surface of the metal film, and the positive electrode active material layer 6 formed on the PTC layer 8. The negative electrode 2 is composed of a metal film serving as the negative electrode current collector 5 (e.g., a copper film) and the negative electrode active material layer 7 formed on the surface of the metal film which comprises a negative electrode active material such as carbon particles bound together by a binder. The separator 3 holds an electrolytic solution containing, for example, lithium ions.

The positive electrode active material layer 6 is a layer formed of a positive electrode active material and a conducting agent bound together with a binder. The positive electrode active material includes, for example, a cobalt oxide, a manganese oxide, and an iron oxide. The cobalt oxide includes $LiCoO_2$ crystals and $LiCoO_2$ crystals part of the Co atoms of which are displaced with transition metal atoms (e.g., Ni atom and Mn atom).

The PTC layer 8 is a layer comprising an electron conductive material containing a conductive filler and a resin. The electron conductive material possesses the property of increasing its resistivity with a rise in temperature. For example, it has such PTC characteristics that the rate of change in resistivity abruptly increases at about a prescribed temperature within a temperature range of from, for example, 90 to 160° C.

The electron conductive material is not particularly limited in shape and can be spherical, elliptical, fibrous or flaky, The electron conductive material having such a shape may be once softened or melted by heating followed by solidification.

The proportion of the conductive filler in the electron conductive material is preferably from 55 to 70 parts by weight.

The conductive filler includes carbon materials and conductive non-oxides. The carbon materials include carbon black, graphite, and carbon fiber. The carbon black includes acetylene black, furnace black, lamp black, thermal black, and channel black. The conductive non-oxides include metal carbides, metal nitrides, metal silicides, and metal borides. The metal carbides include TiC, Zrc, Vc, NbC, Tac, $Mo_2C$, WC, $B_4C$, and $Cr_3C_2$. The metal nitrides include TiN, ZrN, VN, NbN, TaN, and $Cr_2N$. The metal borides include $TiB_2$, $ZrB_2$, $NbB_2$, $TaB_2$, CrB, MoB, and WB.

The resin is a polymer, such as high-density polyethylene (melting point: 130 to 140°), low-density polyethylene (melting point: 110 to 112° C.), a polyurethane elastomer (melting point: 140 to 160° C.), and polyvinyl chloride (melting point: about 145° C.). The melting point of these resins is in a range of from 90° to 160° C.

Because the temperature at which the electron conductive material contained in the PTC layer 8 manifests its PTC function is dependent on the melting point of the resin contained in the electron conductive material 9, the temperature at which the PTC function is manifested can be set at a temperature in a range of from 90° to 160° C. by selecting the material or kind of the resin.

The rate of change in resistivity of the positive electrode 1 (especially the PTC layer 8) at about the prescribed temperature (i.e., the temperature for the PTC function to be activated) is desirably 50 to 10000.

Where the resin contained in the electron conductive material is a crystalline resin, the rate of resistivity change can be made greater at or in the vicinity of the temperature at which the PTC function of the electron conductive material 9 is manifested.

The PTC characteristics may be either reversible so that it could be manifested twice or more or irreversible so that the initial resistivity is not restored even when a temperature drop follows manifestation of the PTC function.

Although it is favorable for security that the PTC function is manifested at or below 90° C., the electrode would increase its resistivity in a temperature range in which batteries are usually used. This will lead to reduction of battery performance, such as load rate characteristics. If the temperature for manifestation of the PTC function exceeds 160° C., the inner temperature of a battery rises up to that temperature, which is unfavorable for safety. Accordingly, it is desirable that the electron conductive material be designed to manifest the PTC function at a temperature ranging from 90° to 160° C.

Since the temperature at which the PTC function is activated is dependent on the melting point of the resin contained in the electron conductive material, the resin is selected from those having a melting point within a range of from 90° to 160° C.

The PTC function of the electron conductive material is manifested because the resin contained therein softens or melts to expand in volume thereby to increase the resistivity of the electron conductive material itself.

The resistivity of the positive electrode 1 in its normal state (i.e., at temperatures below the temperature for the PTC function to be activated) can be controlled by varying the proportion of the electron conductive material 9 (or the thickness of the PTC layer 8) in the positive electrode 1. With the PTC layer 8 having a thickness of 1 to 200 $\mu$m, the electrode has a low resistivity in its normal state and an increased resistivity in case of abnormality (i.e., at temperatures above the temperature for the manifestation of the PTC function). It is more desirable for the PTC layer 8 to have a thickness of 5 to 100 $\mu$m.

It is desirable for the electron conductive material to have a particle size of from 0.05 to 100 $\mu$m.

In the positive electrode 1 of the battery of invention, since the electron conductive material itself, which is present in the PTC layer 8, has PTC characteristics, the PTC layer 8 increases its own resistivity upon the temperature of the positive electrode 1 exceeding over the temperature at which the PTC function manifests itself.

Accordingly, with the electrode having such PTC characteristics applied to a battery (in this particular embodiment, applied to the positive electrode 1 of a battery), in case of such an abnormality in which the current should increase due to a short-circuit outside or inside the battery and, as a result, the battery or electrode temperature should increase above a PTC function manifestation temperature (around the melting point of the resin in this particular embodiment), the electrode (especially the PTC layer 8) increases its own resistivity. It follows that the current flowing inside the battery decreases. Thus, a battery assembled by using the electrode will have markedly improved safety. That is, the safety will be maintained even in case of abnormalities, such as a short-circuit under strict conditions, a back charge, an overcharge, and the like.

While the invention has been described with reference to a particular embodiment in which the PTC layer 8 is provided in the positive electrode 1, the invention is not limited thereto. The same effects are produced when the negative electrode 2 is provided with a PTC layer.

In the following are described processes for preparing the positive and negative electrodes shown in the Figure and a method of preparing a battery.

Method of Preparing Positive Electrode:

An electron conductive material whose volume resistivity is sufficiently low at room temperature but high at temperatures above a prescribed temperature between 90° C. and 160° C. (e.g., pellets comprising a conductive filler and a resin in a prescribed ratio) is pulverized to obtain fine particles of the electron conductive material.

Methods of pulverizing an electron conductive material include a method using compressed air or compressed inert gas such as nitrogen or argon, which can be embodied as follows. An ultrasonic stream of the above-mentioned gas is generated, and the particulate electron conductive material is made to collide with each other or against a wall (not shown) in the stream to be pulverized into fine particles of small diameter (this mode will be referred to as a jet mill method).

In particular, in order to obtain the electron conductive material having a small particle size, it is desirable to pulverize an electron conductive material by a jet mill method.

Another method for pulverizing an electron conductive material comprises applying a combination of shear force, frictional force, and impact force to the electron conductive material. This method is embodied by, for example, pulverizing an electron conductive material by means of uneven blades of a spinning rotor (not shown) and a stator (not shown) to obtain fine particles of the electron conductive material (this method will be referred to as a combined method).

Still another method for pulverizing an electron conductive material comprises shearing an electron conductive material put in a rotating ball mill (this method will be referred to as a ball mill method).

In particular, fine particles of an electron conductive material having a small particle size and reduced variation of particle size can be obtained by pulverizing the electron conductive material by a combined method or a ball mill method and further pulverizing the resulting powder by a jet mill method. Further, where pulverization of the electron conductive material is carried out while cooling, the resulting particles have a further reduced size.

The resulting fine particles of an electron conductive material and a first binder (e.g., PVDF) are dispersed in a first dispersing medium (e.g., N-methylpyrrolidone, hereinafter abbreviated as NMP). The resulting paste is applied to a current collector substrate (e.g., a metal film of prescribed thickness), which serves as a positive electrode current collector 4, and dried at a prescribed temperature to form a PTC layer.

A positive electrode active material, a conducting agent, and a second binder (e.g., PVDF) are dispersed in a second dispersing medium (e.g., NMP) to prepare a positive electrode active material paste. The resulting paste is applied to the PTC layer 8 and dried at a prescribed temperature.

The positive electrode active material paste applied on the PTC layer 8 is then pressed at a prescribed temperature under a prescribed pressure to obtain a positive electrode 1 having the PTC layer 8 of prescribed thickness and the positive electrode active material layer of prescribed thickness on the positive electrode current collector 4.

According to the above-described process, since the pressing is carried out at a prescribed temperature under a prescribed pressure, adhesion between the PTC layer 8 and the positive electrode current collector 4 and between the PTC layer 8 and the positive electrode active material layer 6 is improved thereby to reduce the contact resistance between the PTC layer 8 and the current collector 4 and the contact resistance between the PTC layer and the active material layer 6. Additionally, the connection among the electron conductive material particles in the PTC layer 8 and the connection among the conducting agent particles in the positive electrode active material layer 6 are also improved thereby to form many current collecting networks in each of the PTC layer and the active material layer 6. As a result, the electrode (positive electrode 1 in this embodiment) has a reduced resistivity in its normal state.

Where the pressing temperature is set at or around the melting point of the resin contained in the electron conductive material of the PTC layer 8, the improvement in adhesion between the PTC layer 8 and the positive electrode current collector 4 and between the PTC layer 8 and the positive electrode active material layer 6 is ensured to further reduce the contact resistance between the PTC layer 8 and the current collector 4 and the contact resistance between the PTC layer 8 and the active material layer 6. In addition, the connection among the electron conductive material particles in the PTC layer 8 is further improved to form more current collecting networks in the PTC layer 8. As a result, the resistivity of the electrode in its normal state can be reduced further.

A method of preparing the negative electrode 2 is described below.

Method of Preparing Negative Electrode:

A negative electrode active material paste is prepared by dispersing mesophase carbon microbeads (hereinafter abbreviated as MCMB) and PVDF in NMP. The resulting negative electrode active material paste is applied to a current collector substrate (e.g., a metal film of prescribed thickness) which will serve as a negative electrode current collector, dried, and pressed at a prescribed temperature under a prescribed pressure to obtain a negative electrode 2 having a negative electrode active material layer 7.

A method of fabricating the battery according to the invention will be described.

Method of Fabricating Battery:

The positive electrode 1 and the negative electrode 2 prepared above are joined together with a separator (e.g., a porous polypropylene sheet) interposed therebetween, and an electrolytic solution is poured therein to obtain a battery having the positive and the negative electrodes. The battery thus obtained increases the resistivity of the positive electrode thereof with an increase in temperature. In case a short-circuit should occur outside or inside the battery to raise the battery temperature, the battery is capable of reducing the short-circuit current thereby securing improved safety.

EXAMPLE 1

Preparation of Positive Electrode:

An electron conductive material which was an electrically conductive polymer having a volume resistivity of 0.2 $\Psi\cdot cm$ at room temperature and of 20 $\Psi\cdot cm$ at 135° C. (pellets comprising carbon black and polyethylene at a weight ratio of 60:40) was pulverized by a jet mill method to prepare fine particles of the electron conductive material having an average particle size of 9.1 $\mu m$. Pulverization by a jet mill method was carried out with a jet mill apparatus (manufactured by Nippon Pneumatic Kogyo).

Ninety parts by weight of the electron conductive material and 10 parts by weight of PVDF as a binder were dispersed in NMP, a dispersing medium. The resulting paste was applied to 20 $\mu m$ thick aluminum foil serving as a positive electrode current collector 4 by a doctor blade coating method and dried at 80° C. to form a PTC layer 8.

A positive electrode active material paste prepared by dispersing 91 parts by weight of a positive electrode active material (e.g., $LiCoO_2$), 6 parts by weight of KS-6 (produced by Lonza) as a conducting agent, and 3 parts by weight of PVDF in NMP was applied to the PTC layer 8 by a doctor blade coating method and dried at 80° C. The coating layers were pressed at room temperature under a pressure of 2.0 $ton/cm^2$ to obtain a positive electrode 1 having, in sequence, the positive electrode current collector 4, the PTC layer 8 having a thickness of about 50 $\mu m$, and the positive electrode active material layer 6 having a thickness of about 100 $\mu m$.

Preparation of Negative Electrode:

A negative electrode active material paste prepared by dispersing 90 parts by weight of mesophase carbon microbeads (hereinafter abbreviated as MCMB) and 10 parts by weight of PVDF in NMP was applied to copper foil having a thickness of about 18 µm, a negative electrode current collector 5, by a doctor blade coating method, dried at 80° C., and pressed at room temperature under a pressure of 2.0 ton/cm$_2$ to obtain a negative electrode 2 having a negative electrode active material layer 7.

The electrode of Example 1 and a battery using the electrode were evaluated in accordance with the following test methods.

Measurement of Resistivity of Electrode:

Aluminum foil was fusion bonded to both sides of the electrode. A voltage terminal and a current terminal of plus side were connected to the aluminum foil on one side, and those of minus side to the aluminum foil on the other side. The terminals were equipped with a heater. A constant current was made to flow through the device while heating the electrode at a rate of 5° C./min, and a reduction in voltage was measured to determine the resistivity.

Capacity Test:

The prepared positive and negative electrodes, both cut to a size of 14 mm×14 mm, were joined together with a porous polypropylene sheet (Cell Guard #2400, produced by Hoechst) interposed therebetween as a separator 3 to prepare a battery body. A current collecting tab was spot welded to each of the positive and the negative electrode current collectors, and the battery body was put in a bag made of an aluminum laminate sheet. An electrolytic solution prepared by dissolving lithium hexafluorophosphate in a mixed solvent of ethylene carbonate and diethyl carbonate (1:1 by mole) in a concentration of 1.0 mol/dm$^3$ was poured into the bag, and the opening of the bag was heat-sealed to complete a battery. The resulting battery was subjected to a charge and discharge test at room temperature, and the discharge capacity at 2 C (C: hour rate) was measured.

Short-circuit Test:

The positive electrode 1 and the negative electrode 2 prepared above, both cut to a size of 38 mm×65 mm, were joined together with a polypropylene sheet (Cell Guard #2400, produced by Hoechst) interposed therebetween as a separator 3. The laminate was sandwiched in between a pair of Teflon plates about 1 mm thick and fixed with adhesive tape. A current collecting tab was attached to the end each of the positive electrode current collector 4 and the negative electrode current collector 5 by ultrasonic welding. The resulting electrode body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was poured into the bag, and the opening of the bag was heat-sealed to complete a battery.

The resulting battery was charged at 80 mA up to 4.2 V at room temperature. After completion of charging, the battery temperature was gradually elevated in an oven, and a short-circuit was caused at 145° C. The current at this time was measured.

Figure 2:
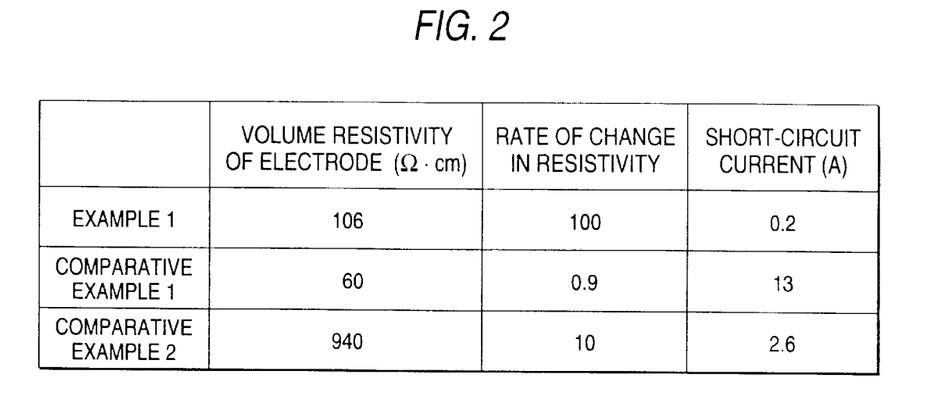
FIG. 2 is a table showing the volume resistivity and rate of change in resistivity of electrodes and the short-circuit current of batteries assembled by using each electrode.

FIG. 2 is a table showing the volume resistivity of the electrode (positive electrode 1), the rate of resistivity change, and the short-circuit current in the short-circuit test in Example 1. The rate of resistivity change is the quotient obtained by dividing the increased resistivity after manifestation of the PTC function by the resistivity before the manifestation.

The positive electrode of Comparative Example 1 shown in the Figure was prepared as follows. A positive electrode active material paste was prepared by dispersing 91 parts by weight of LiCoO$_2$ as an active material, 6 parts by weight of a conducting agent (e.g., KS-6 produced by Lonza), and 3 parts by weight of PVDF in NMP. The resulting paste was applied to 20 µm thick aluminum foil serving as a positive electrode current collector 5 by a doctor blade coating method, dried at 80° C, and pressed at room temperature under a pressure of 2.0 ton/cm$^2$ to form an about 100 µm thick positive electrode active material layer. The negative electrode of Comparative Example 1 was prepared in the same manner as in Example 1.

The positive electrode of Comparative Example 2 shown in the Figure was prepared in the same manner as in Example 1, except that pressing of the dried positive electrode active material paste at room temperature was not conducted. The negative electrode of Comparative Example 2 was prepared in the same manner as in Example 1.

As shown in the Figure, it is understood from a comparison between Example 1 and Comparative Example 1 that the resistivity of the electrode of Example 1 (positive electrode 1) having the PTC layer 8 between the positive electrode current collector 4 and the positive electrode active material layer 6 multiplies about 100 times upon manifestation of the PTC function. On the other hand, having no PTC layer comprising a resin-containing electron conductive material, the electrode of Comparative Example 1 does no increase the rate of resistivity change.

In Comparative Example 2, since the positive electrode is prepared without pressing the dried positive electrode active material paste, the adhesion between the positive electrode current collector 4 and the PTC layer 8 and the adhesion between the PTC layer 8 and the positive electrode active material layer 6 are poor. As a result, the electrode of Comparative Example 2 has a high volume resistivity and a low rate of resistivity change as compared with Example 1. Accordingly, it is recognized that the battery assembled by using the electrode of Comparative Example 2 undergoes an increase in short-circuit current in case of a short-circuit.

To the contrary, since the electrode of Example 1 has been prepared by pressing the dried positive electrode active material paste, it has improved adhesion between the positive electrode current collector 4 and the PTC layer 8, improved adhesion between the PTC layer 8 and the positive electrode active material layer 6, improved connection among the electron conductive material particles in the PTC layer 8, and improved connection among the conducting agent particles in the positive electrode active material layer 6. As a result, the electrode of Example 1 has a reduced volume resistivity and an increased rate of resistivity change.

Accordingly, use of the electrode of Example 1 provides a highly safe battery which performs the PTC function to reduce the short-circuit current in case of a temperature rise above a prescribed temperature.

Figure 3:
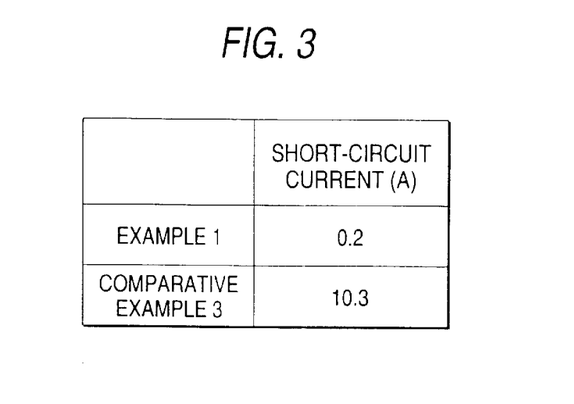
FIG. 3 is a table showing the short-circuit current of batteries assembled by using an electrode.

FIG. 3 is a table showing the short-circuit current in a short-circuit test. The positive electrode of Comparative Example 3 shown in the Figure was obtained in the same manner as for the positive electrode of Example 1, except that the electron conductive material contained in the PTC layer 8 comprised carbon black and a polypropylene resin (melting point: 168° C).

As is shown, the battery assembled by using the electrode of Example 1 manifested the PTC function at 145° C. to reduce the short-circuit current. To the contrary, the battery assembled by using the electrode of Comparative Example 3 had a high short-circuit current at 145° C., which was lower than the melting point of the polypropylene resin so that the PTC function was not activated.

It is thus understood that use of the battery of Example 1 provides a highly safe battery which performs the PTC function at temperatures between 90 and 160° C. to reduce the short-circuit current.

EXAMPLE 2
Preparation of Positive Electrode:

An electron conductive material that was an electrically conductive polymer having a volume resistivity of 0.2 Ψ·cm at room temperature and of 20 Ψ·cm at 135° C. (pellets comprising carbon black and polyethylene at a weight ratio of 60:40) was pulverized by a jet mill method to prepare fine particles of the electron conductive material having an average particle size of 9.1 µm.

Ninety parts by weight of the resulting electron conductive material and 10 parts by weight of PVDF as a binder were dispersed in NMP. The resulting paste was applied to about 20 µm thick aluminum foil serving as a positive electrode current collector 4 by a doctor blade coating methods dried at 80° C., and pressed at room temperature under a pressure of 2.0 ton/cm$^2$ to form a PTC layer 8 on the positive electrode current collector 4.

A positive electrode active material paste prepared by dispersing 91 parts by weight of a positive electrode active material comprising LiCoO$_2$, 6 parts by weight of a conducting agent (e.g., KS-6 produced by Lonza), and 3 parts by weight of PVDF in NMP was applied to a sheet of Mylar by a doctor blade coating method and dried at 80° C. The resulting positive electrode active material layer was brought into contact with the PTC layer 8, and the laminate was pressed at room temperature under a pressure of 2/0 ton/cm$^2$. The Mylar sheet was stripped off the positive electrode active material layer to obtain a positive electrode 1 having the positive electrode active material layer 6 on the PTC layer 8.

A negative electrode was prepared in the same manner as in Example 1.

Figure 4:
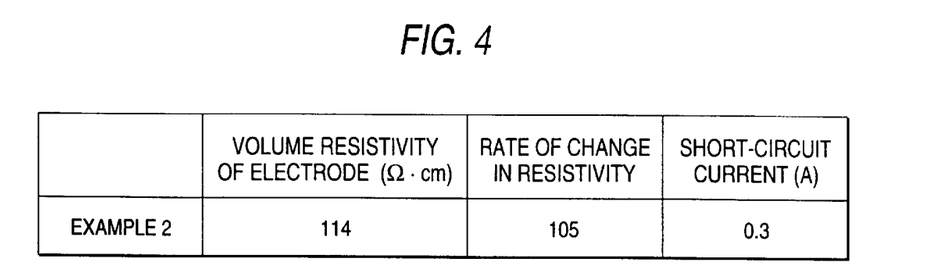
FIG. 4 is a table showing the volume resistivity and rate of change in resistivity of an electrode and the short-circuit current of a battery assembled by using the electrode.

FIG. 4 is a table giving the volume resistivity of the electrode (positive electrode 1), the rate of resistivity change, and the short-circuit current of a battery assembled by using the electrode.

It is seen from the Figure that the electrode (positive electrode 1) of Example 2 is equal to the electrode of Example 1 in volume resistivity and rate of resistivity change and that the battery obtained by using the electrode of Example 2 is equal to that of Example 1 in battery characteristics. It is understood therefore that Example 2 produces the same effects as obtained in Example 1.

Further, because the method of preparing the electrode (positive electrode 1) of Example 2 includes the step of pressing a paste (positive electrode active material paste), the thickness of the PTC layer 8 and that of the positive electrode active material layer 6 can be adjusted independently. Besides, the adhesion between the PTC layer 8 and the positive electrode current collector 4 and the adhesion between the PTC layer 8 and the positive electrode active material layer 6 can be adjusted independently.

Where the pressing temperature is set at or around the melting point of the resin contained in the electron conductive material, the adhesion between the PTC layer 8 and the positive electrode current collector 4 and the adhesion between the PTC layer 8 and the positive electrode active material layer 6 will be improved further to reduce the contact resistance among these layers. At the same time, the connection among the electron conductive material particles in the PTC layer 8 will be improved further to form more current collecting networks in the PTC layer 8. It will follow that the resistance of the PTC layer 8 in its normal state is reduced further, leading to a further reduction in resistivity of the electrode in its normal state.

EXAMPLE 3
Preparation of Positive Electrode:

A positive electrode 1 was prepared in the same manner as in Example 1 with the following exception. The PTC layer was formed on aluminum foil serving as a positive electrode current collector 4. The positive electrode active material paste was applied on the PTC layer 8 by a doctor blade coating method, dried at 80° C., and pressed at 135° C. under a pressure of 2.0 ton/cm$^2$ to obtain the positive electrode 1 having, in sequence, the positive electrode current collector 4, the PTC layer 8 having a thickness of about 50 µm, and the positive electrode active material layer 6 having a thickness of about 100 µm.

A negative electrode was prepared in the same manner as in Example 1.

Figure 5:
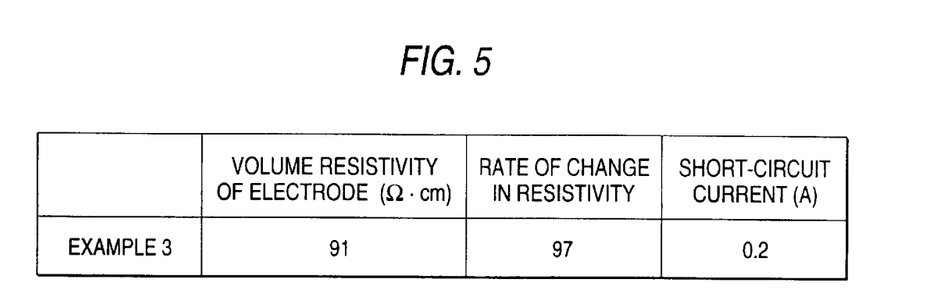
FIG. 5 is a table showing the volume resistivity and rate of change in resistivity of an electrode and the short-circuit current of a battery assembled by using the electrode.

FIG. 5 is a table giving the volume resistivity of the electrode (positive electrode 1), the rate of resistivity change, and the short-circuit current of a battery assembled by using the electrode.

It is seen from the Figure that the electrode (positive electrode 1) of Example 3 is lower than that of the electrode of Example 1. This is because the temperature for pressing the dried positive electrode active material paste was in the vicinity the melting point of the resin contained in the electron conductive material of the PTC layer 8 (polyethylene having a melting point of 130 to 140° C.). As a result, the adhesion between the PTC layer 8 and the positive electrode current collector 4 and the adhesion between the PTC layer 8 and the positive electrode active material layer 6 were improved further to further reduce the contact resistance between the PTC layer 8 and the positive electrode current collector 4 and the contact resistance between the PTC layer 8 and the positive electrode active material layer 6. At the same time, the connection among the electron conductive material particles in the PTC layer 8 was improved further to form more current collecting networks in the PTC layer 8. It followed that the resistance of the PTC layer 8 in its normal state was reduced further, leading to a further reduction in resistivity of the electrode in its normal state.

EXAMPLE 4
Preparation of Positive Electrode:

Ninety-one parts by weight of a positive electrode active material (e.g., LiCoO$_2$), 6 parts by weight of a conducting agent (e.g., artificial graphite KS-6, produced by Lonza), and 3 parts by weight of PVDF were dispersed in NMP to prepare a positive electrode active material paste. The paste was applied to 20 µm thick aluminum foil serving as a positive electrode current collector 4 by a doctor blade coating method, dried at 80° C., and pressed at room temperature under a pressure of 2.0 ton/cm$^2$ to obtain a positive electrode 1 having a positive electrode active material layer 6 on the positive electrode current collector 4.

Preparation of Negative Electrode:

An electron conductive material which was an electrically conductive polymer having a volume resistivity of 0.2 Ψ·cm at room temperature and of 20 Ψ·cm at 135° C. (pellets prepared by kneading carbon black and polyethylene at a weight ratio of 60:40) was pulverized by a jet mill method to prepare fine particles of the electron conductive material having an average particle size of 9.1 µm.

A paste prepared by dispersing 90 parts by weight of the electron conductive material and 10 parts by weight of PVDF in NMP was applied to copper foil having a thickness of about 18 µm, which was to serve as a negative electrode current collector 5, by a doctor blade coating method and dried at 80° C. to form a PTC layer on the negative electrode current collector 5.

A negative electrode active material paste prepared by dispersing 90 parts by weight of MCMB and 10 parts by weight of PVDF in NMP was applied onto the PTC layer by a doctor blade coating method, dried at 80° C., and pressed at room temperature under a pressure of 2.0 ton/cm$_2$ to obtain a negative electrode 2 having, in sequence, the negative electrode current collector 5, the PTC layer, and a negative electrode active material layer 7.

Figure 6:
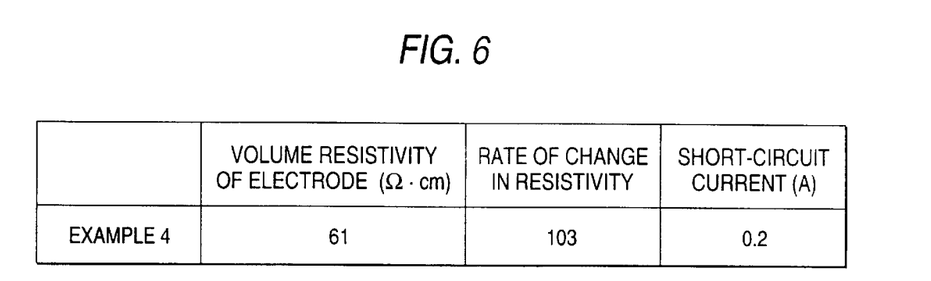
FIG. 6 is a table showing the volume resistivity and rate of change in resistivity of an electrode and the short-circuit current of a battery assembled by using the electrode.

FIG. 6 is a table giving the volume resistivity of the electrode (negative electrode 2), the rate of resistivity change and the short-circuit current of a battery assembled by using the electrode.

It is seen from the Figure that the same effects as in Example 1 can be obtained when the PTC layer is provided between the negative electrode current collector 5 and the negative electrode active material layer 7.

EXAMPLE 5

Figure 7:
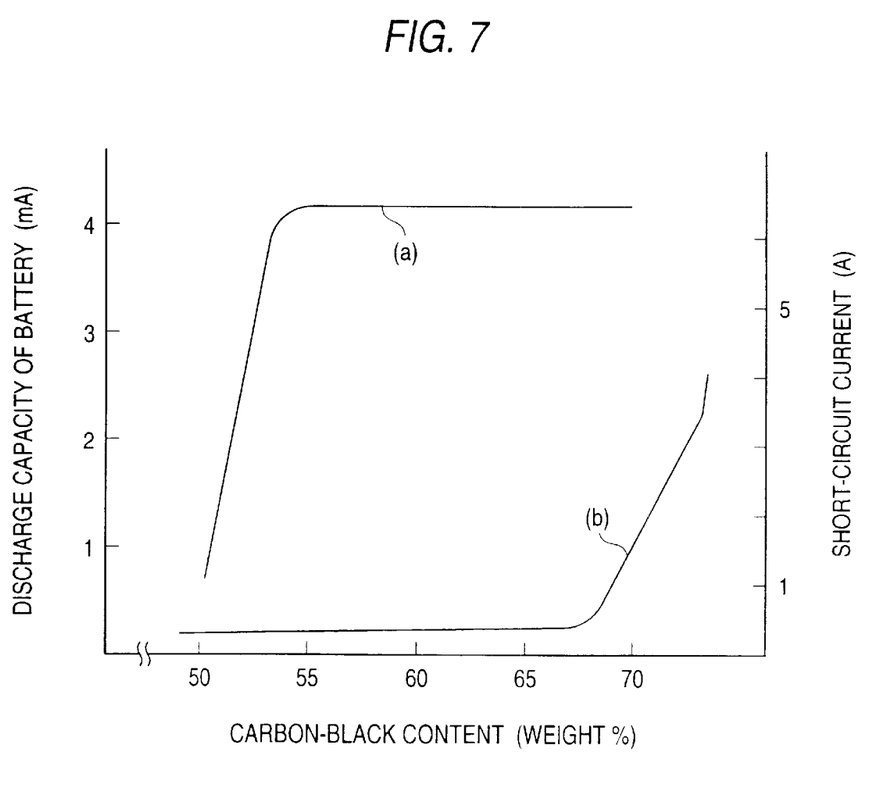
FIG. 7 is a graph depicting the relationship between carbon black content in an electron conductive material and discharge capacity and short-circuit current of a battery.

FIG. 7 is a graph showing the relationship between the carbon black content in an electron conductive material and the discharge capacity of a battery (curve (a)) and the relationship between the carbon black content in the electron conductive material and the short-circuit current of the battery (curve (b)).

As can be seen from the Figure, where the carbon black content is less than 55 parts by weight, the electrode (especially the PTC layer 8) has an increased resistivity so that the discharge capacity of the battery decreases.

On the other hand, where the carbon black content exceeds 70 parts by weight, the rate of change in resistivity of the electrode (especially the PTC layer 8) is low so that the short-circuit current becomes high.

Accordingly, the rate of change in resistivity of the electrode can be increased by using the carbon black in the electron conductive material in a proportion of from 55 to 70 parts by weight. As a result, the resistivity of the electrode can be kept low at temperatures below a prescribed temperature and be increased when the temperature exceeds the prescribed temperature. It is now understood that a battery assembled by using the electrode has an increased discharge capacity in the normal state and is capable of decreasing a short-circuit current in case of abnormality.

EXAMPLE 6

Figure 8:
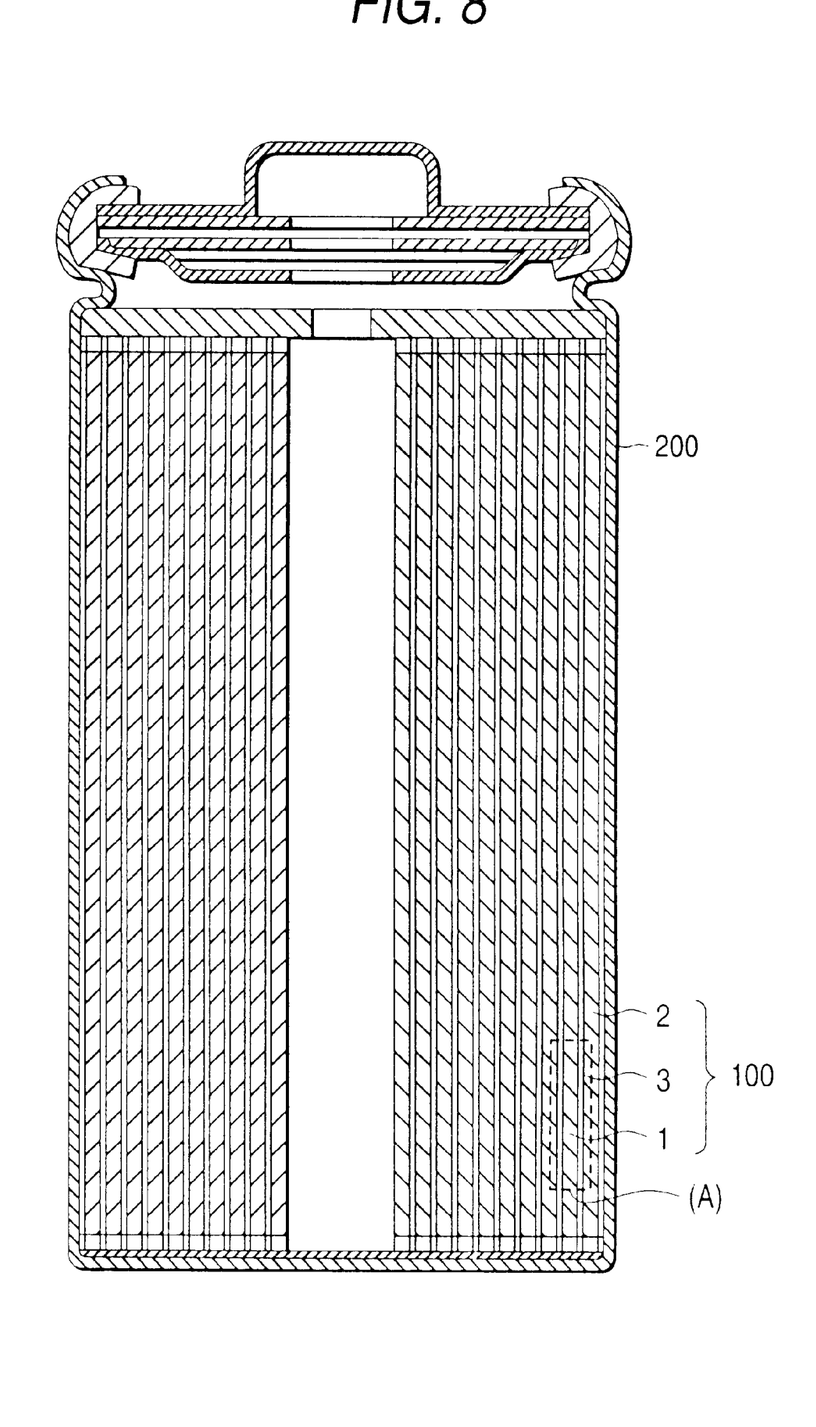
FIG. 8 is a cross-sectional view showing the structure of a cylindrical lithium ion secondary battery.

FIG. 8 illustrates an example of applications of the electrodes and batteries described in the foregoing Examples to a lithium ion secondary battery. Specifically, FIG. 8 is a schematic cross section showing the structure of a cylindrical lithium ion secondary battery.

Figure 9:
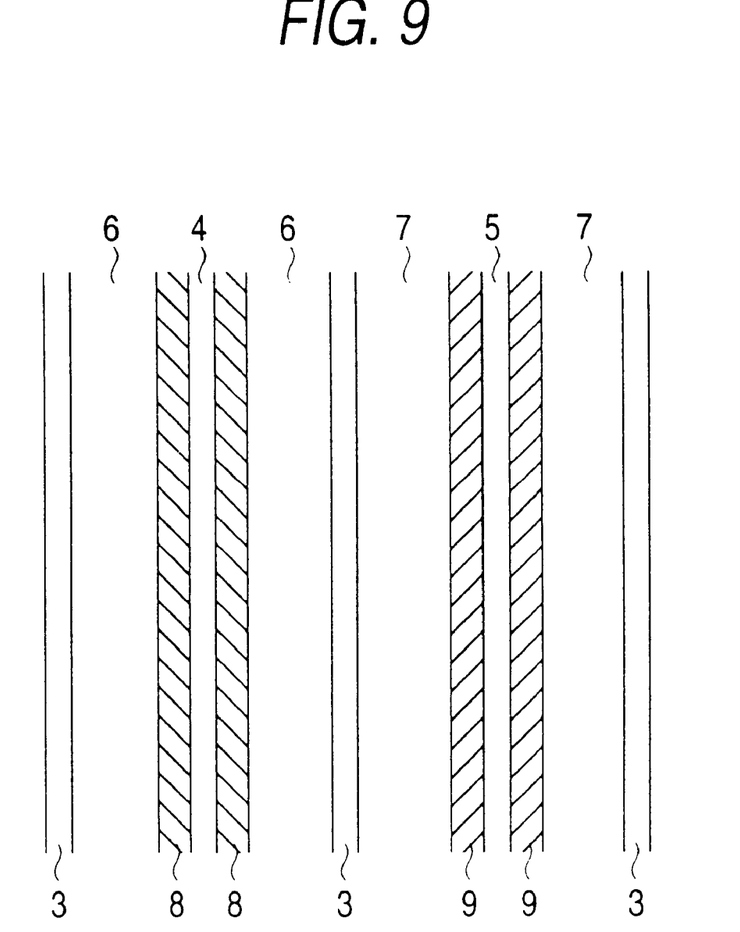
FIG. 9 is a partial enlarged view of FIG. 8.

FIG. 9 is a partial enlarged view of part (a) of FIG. 8.

In the Figure, numeral 200 is a case made of stainless steel, etc. which also serves as a negative electrode terminal, and numeral 100 is a battery body put in the case 200. The battery body 100 has a positive electrode 1, a separator 3, and a negative electrode 2 rolled up together.

The positive electrode 1 has a positive electrode current collector 4, a positive electrode active material layer 6, and a PTC layer 8 that is a first electron conductive material layer.

The negative electrode 2 has a negative electrode current collector 5, a negative electrode active material layer 7, and a PTC layer 9 that is a second electron conductive material layer.

The PTC layer 8 is between the positive electrode current collector 4 and the positive electrode active material layer 6, and the PTC layer 9 is between the negative electrode current collector 5 and the negative electrode active material layer 7.

Having the above-described structure, when the current increases due to a short-circuit outside or inside the battery, and the temperature of the positive electrode 1 or the negative electrode 2 rises to or above a certain extent, the PTC layer 8 or the PTC layer 9 increases its own resistivity so that the current flowing inside the battery body 100 decreases. Thus, the battery assembled by using the positive electrode 1 or the negative electrode 2 shown in the Figure exhibits markedly improved safety. That is, the safety is maintained even in case of abnormalities, such as a short-circuit under strict conditions, a back charge or an overcharge.

In this example the PTC layer 8 is provided between the positive electrode current collector 4 and the positive electrode active material layer 6, and the PTC layer 9 is provided between the negative electrode current collector 5 and the negative electrode active material layer 7, but the invention is not limited to this embodiment.

For example, control of the current flowing inside the battery body 100 could be achieved only with the PTC layer 8 provided between the positive electrode current collector 4 and the positive electrode active material layer 6 or only with the PTC layer 9 provided between the negative electrode current collector 5 and the negative electrode active material layer 7. Further, the PTC layer 8 may be provided only one side of the positive electrode current collector 4, or the PTC layer 9 may be provided only one side of the negative electrode current collector 5.

The electrodes and batteries described in the foregoing Examples are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is not limited, and applications include primary and secondary batteries of laminated type, rolled type, button type, and the like.

Industrial Applicability

The electrode and battery according to the invention are applicable to not only lithium ion secondary batteries of organic electrolytic solution type, solid electrolyte type or gel electrolyte type but primary batteries, such as a lithium-manganese dioxide battery, and other types of secondary batteries. They are also effective in primary and secondary batteries of aqueous solution type. Further, the battery shape is not limited, and applications include primary and secondary batteries of laminated type, rolled type, button type, and the like.

What is claimed is:
1. An electrode comprising:
    an electron conductive particle layer including electron conductive particles having a conductive filler and a resin; and
    an active material layer formed on the electron conductive particle layer,
    wherein the electron conductive particle layer increases in resistivity with a rise in temperature; and
    wherein the proportion of the conductive filler in the electron conductive particles is from 55 to 70 parts by weight.

2. The electrode as set forth in claim 1, wherein the resin has a melting point ranging from 90° C. to 160° C.

3. The electrode as set forth in claim 1, wherein the electron conductive particles have an average particle size of from 0.05 μm to 100 μm.

4. The electrode as set forth in claim 1, wherein the conductive filler is a carbon material or a conductive nonoxide.

5. The electrode as set forth in claim 1, wherein the resin is a crystalline resin.

6. A battery having a positive electrode, a negative electrode, and an electrolytic solution provided between the positive and the negative electrodes, wherein the negative electrode or the positive electrode is the electrode according to any one of claims 1 to 5.

7. The electrode according to claim 1, wherein the electron conductive particles are 0.05 μm to 100 μm in particle size.

8. An electron conductive particle layer formed on an active material layer of an electrode, the electron conductive particle layer comprising:

electron conductive particles having a conductive filler and a resin; and the conductive filler is at least 55 parts by weight but no more than 70 parts by weight of the electron conductive particles, wherein the electron conductive particle layer manifests at least a fifty-fold but less than a ten-thousand-fold variance in resistivity upon activating a PTC function of the electron conductive particle layer, the PTC function being activated at a prescribed temperature of at least 90° C. but no more than 160° C.

9. The electron conductive particle layer of claim 8, wherein the variance in resistivity is at least a factor of 100 but less than a factor of 10,000 upon activating the PTC function.

10. The electron conductive particle layer of claim 8, wherein the PTC function is activated above a melting point of the resin.

11. The electron conductive particle layer of claim 10, wherein the electron conductive particles have a particle size of at least 0.05 μm but not more than 100 μm.

12. The electron conductive particle layer of claim 11, wherein the conductive filler is a carbon material or a conductive nonoxide.

13. The electron conductive particle layer of claim 12, wherein the resin is a crystalline resin.

14. The electron conductive particle layer of claim 13, wherein the PTC function is reversible.

15. The electron conductive particle layer of claim 13, wherein the PTC function is irreversible.

16. The electron conductive particle layer of claim 8, wherein the electron conductive particles are 0.05 to 100 μm in particle size.

* * * * *